US012649954B2

(12) United States Patent
Luebbers et al.

(10) Patent No.: US 12,649,954 B2
(45) Date of Patent: Jun. 9, 2026

(54) CRYSTALLIZATION DEVICE FOR CRYSTALLIZING A PRECURSOR, AND DRYING DEVICE

(71) Applicant: LUEBBERS FTS GMBH, Bad Langensalza (DE)

(72) Inventors: Matthias Luebbers, Bad Langensalza (DE); Markus Luebbers, Bad Langensalza (DE)

(73) Assignee: LUEBBERS FTS GMBH, Bad Langensalza (DE)

( * ) Notice: Subject to any disclaimer, the term of this patent is extended or adjusted under 35 U.S.C. 154(b) by 340 days.

(21) Appl. No.: 18/039,718

(22) PCT Filed: Dec. 1, 2021

(86) PCT No.: PCT/DE2021/200231
§ 371 (c)(1),
(2) Date: Jun. 1, 2023

(87) PCT Pub. No.: WO2022/117169
PCT Pub. Date: Jun. 9, 2022

(65) Prior Publication Data
US 2024/0018612 A1     Jan. 18, 2024

(30) Foreign Application Priority Data

Dec. 2, 2020     (DE) ..................... 10 2020 132 043.4

(51) Int. Cl.
*F26B 3/12*          (2006.01)
*B01D 9/00*          (2006.01)
*C13K 5/00*          (2006.01)

(52) U.S. Cl.
CPC .............. *C13K 5/00* (2013.01); *B01D 9/0059* (2013.01); *F26B 3/12* (2013.01)

(58) Field of Classification Search
CPC ........... C13K 5/00; F26B 3/12; B01D 9/0013; B01D 9/0031; B01D 9/0063; B01D 9/005;
(Continued)

(56) References Cited

U.S. PATENT DOCUMENTS 2,882,133 A  *  4/1959  Mckay ................... B01D 9/004
                                               23/295 R
3,593,536 A  *  7/1971  Lafay ....................... C08G 2/38
                                               62/544
(Continued)

FOREIGN PATENT DOCUMENTS

CN         208726784 U     4/2019
DE           2157267 A1    5/1972
(Continued)

OTHER PUBLICATIONS

English translation of publication ES 245866_A3, Jun. 1, 1959. (Year: 1959).*
(Continued)

*Primary Examiner* — Joseph W Drodge
(74) *Attorney, Agent, or Firm* — Norman B. Thot

(57) ABSTRACT

A crystallization apparatus for a crystallization of a preliminary product. The crystallization apparatus includes an inlet for receiving the preliminary product, a rotary drive, and a rotatable receiving unit having, on an upper side thereof, a circular surface and/or an annular surface for the crystallization so that, when the rotatable receiving unit is rotated, the preliminary product received can be recrystallized in a defined manner on the circular surface and/or the annular surface and can be discharged as a crystallized product.

19 Claims, 2 Drawing Sheets

(58) Field of Classification Search
CPC . B01D 9/00; B01D 9/0059; B01D 2009/0086
See application file for complete search history.

(56)                          References Cited

U.S. PATENT DOCUMENTS

| | | | | |
|---|---|---|---|---|
| 3,829,293 | A  * | 8/1974 | Waquier ............... | B01D 9/0009 |
| | | | | 422/245.1 |
| 5,006,204 | A | 4/1991 | Jensen | |
| 2003/0196957 | A1 * | 10/2003 | Henningfield ......... | A23C 21/00 |
| | | | | 210/651 |
| 2004/0005235 | A1 * | 1/2004 | Didin ........................ | F01C 3/02 |
| | | | | 418/226 |
| 2008/0230051 | A1 | 9/2008 | Bonke | |

FOREIGN PATENT DOCUMENTS

| | | | |
|---|---|---|---|
| DE | 100 47 162 | A1 | 4/2002 |
| DE | 101 49 814 | A1 | 4/2003 |
| DE | 21 2020 000 057 | U1 | 6/2020 |
| ES | 245866 | A3 * | 6/1959 |

OTHER PUBLICATIONS

Kreyenborg GmbH & Co. KG: „Kristallisation von PET Masterbatches",
hhttps://www.kreyenborg.com/kristallisation-von-et-
masterbatches", pp. 1-4, (2012), with English version.

\* cited by examiner

CRYSTALLIZATION DEVICE FOR CRYSTALLIZING A PRECURSOR, AND DRYING DEVICE

CROSS REFERENCE TO PRIOR APPLICATIONS

This application is a U.S. National Phase application under 35 U.S.C. § 371 of International Application No. PCT/DE2021/200231, filed on Dec. 1, 2021 and which claims benefit to German Patent Application No. 10 2020 132 043.4, filed on Dec. 2, 2020. The International Application was published in German on Jun. 9, 2022 as WO 2022/117169 A1 under PCT Article 21(2).

FIELD

The present invention relates to a crystallization apparatus for the crystallization of a preliminary product, wherein the crystallization apparatus has an inlet for receiving the preliminary product, a rotary drive, and a rotatable receiving unit. The present invention further relates to a drying apparatus, in particular a spray tower, for the drying of a material to be dried to form a pre-dried product and/or for the final drying of a crystallized product.

BACKGROUND

In various branches of industry, such as in the foodstuffs industry, basic chemistry, and the pharmaceutical industry, preliminary products and/or products are crystallized in order to convert them into a desired form and/or chemical modification. The substance to be crystallized can in principle be supplied in the form of a liquid, a melt, and/or a solid to a crystallizer. A crystal layer in a crystallizer in particular forms when the substance to be crystallized wets and/or covers a surface of the crystallizer, which surface is usually cooler.

For example, whey permeate is used in the confectionery industry. Whey permeate is formed in the production of whey protein concentrates from whey from cheese production. The liquid whey permeate that is left behind is concentrated, dried, and crystallized. Whey permeate usually contains 44 to 50 g/l α-lactose. After the spray drying process, α-lactose is converted into the desired β-lactose crystals in a crystallizer, and a secondary drying and cooling process can then follow. In order to achieve crystallization of the pre-dried permeate powder, a crystallization conveyor belt is, for example, known. The crystallization conveyor belt is equipped with an electric gear motor drive and a tensioning system for belt guidance. The belt itself is configured in the manner of an open fabric in order to allow cleaning through the fabric of the belt. The fabric of the belt is nevertheless readily colonized by microorganisms, and there is consequently the risk of inadequate hygiene or even an absence of hygiene in the case of CIP (clean-in-place) cleaning. The usability of such a crystallizer is limited because of the hygiene requirements, in particular in the foodstuffs industry and in the pharmaceutical industry.

The large space requirement of the linear conveyor section of the crystallization conveyor belt is in particular disadvantageous. The crystallization conveyor belt is also set up to convey upward in an obliquely ascending manner so that a correspondingly large installation space is required not only in the conveying direction, but also in the upward direction.

The corporate document of Kreyenborg GmbH & Co. KG "Crystallization of PET masterbatches" of Jul. 27, 2012 describes an infrared rotating drum in a crystallization and drying installation for PET granules and ground material. A closed crystallizer in the form of a rotatable tank for the precipitation of metal salts from a mineral column is also described in DE 21 57 267 A3. A closed crystallization or precipitation apparatus having a rotating drum and an at least partially microstructured, self-cleaning surface, is likewise described in DE 100 47 162 A1.

DE 101 49 814 A1 describes an apparatus for producing crystals in which a substantially cylindrical crystallization vessel for receiving a solution has a coaxial, rotatable, substantially cylindrical inner part to form a radial annular chamber, wherein the flow profile of a Couette flow of the crystallization solution is produced in the annular chamber.

A closed crystallization apparatus having an outer heat insulation cylinder and an inner, rotatable heat-conducting cylinder is also described by DE 21 2020 000 057 U1, wherein a push plate located in the interior of the heat-conducting cylinder serves to move the crystals in the direction towards a circular hole and discharge them.

A disadvantage of such closed, rotating crystallization apparatuses is that a mixing of the crystallizing preliminary product always takes place at the same time so that the preliminary product is thus always present in different crystallization stages.

SUMMARY

An aspect of the present invention is to improve on the prior art.

In an embodiment, the present invention provides a crystallization apparatus for a crystallization of a preliminary product. The crystallization apparatus includes an inlet for receiving the preliminary product, a rotary drive, and a rotatable receiving unit comprising on an upper side thereof at least one of a circular surface and an annular surface for the crystallization so that, when the rotatable receiving unit is rotated, the preliminary product received can be recrystallized in a defined manner on the at least one of the circular surface and the annular surface and can be discharged as a crystallized product.

BRIEF DESCRIPTION OF THE DRAWINGS

The present invention is described in greater detail below on the basis of embodiments and of the drawings in which.

DETAILED DESCRIPTION

Figure 1:
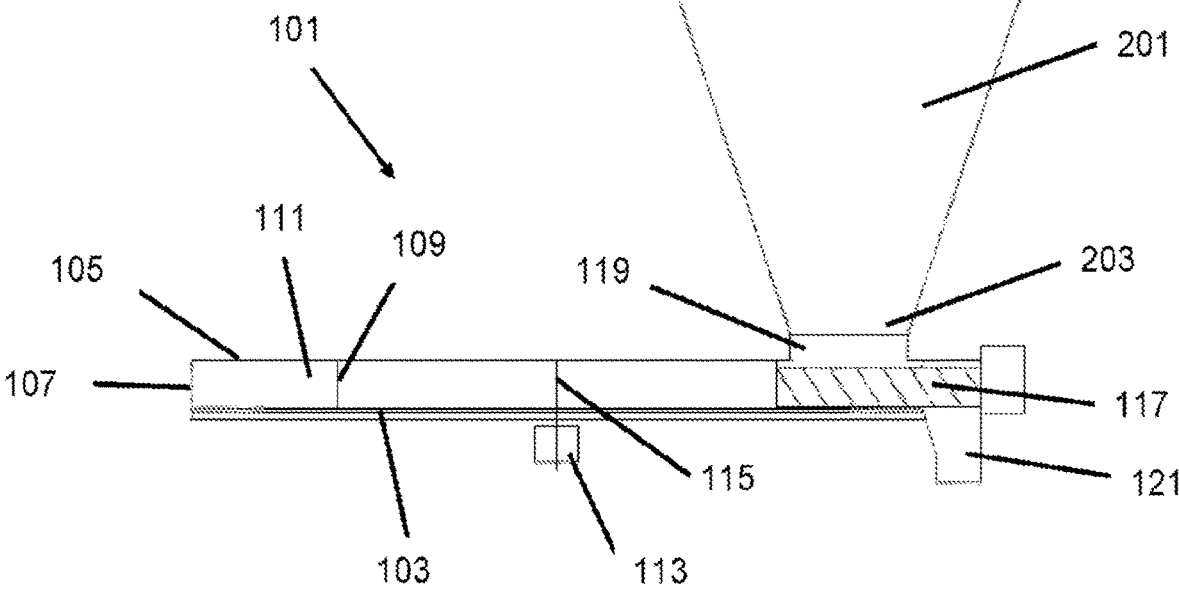
FIG. 1 shows a schematic representation of a crystallization rotor having a spray tower outlet of a spray tower arranged thereabove.

The present invention provides a crystallization apparatus for crystallizing a preliminary product, wherein the crystallization apparatus has an inlet for receiving the preliminary product, a rotary drive, and a rotatable receiving unit, and the rotatable receiving unit has on its upper side a circular and/or annular surface for the crystallization so that, in rotation of the rotatable receiving unit, the received preliminary product can be recrystallized in a defined manner on the circular and/or annular surface of the rotatable receiving unit and can be discharged as a crystallized product.

It is particularly advantageous that the preliminary product to be crystallized can be applied directly to the surface of the rotatable receiver through the inlet, without the need for a conveying device. For example, the pre-dried powder falls from the spray tower or from another unit of another pre-treatment process onto the upper surface of the rotatable receiving unit. Improved crystallization takes place because the preliminary product to be crystallized covers the upper circular and/or annular surface of the receiving unit directly and is cooled thereby. The preliminary product to be crystallized is above all no longer mixed after it has been applied to the circular and/or annular surface of the rotatable receiving unit, but is crystallized continuously and thus under defined conditions in a fixed position on the circular and/or annular surface while the receiving unit and thus the circular and/or annular surface rotate. A rotating receiving and/or resting belt for a defined crystallization and conversion from one crystal modification into another crystal modification is therefore provided via the circular and/or annular surface of the rotatable receiving unit. As a result of the defined crystallization under defined crystallization conditions in a circular movement, a high quality of the crystallized product is moreover obtained. In the case of the crystallization of whey permeate powder in the crystallization apparatus, a high conversion rate from α-lactose into the desired β-lactose crystals is thus achieved, and these are obtained in a high purity.

A fundamental idea of the present invention is to not make the upper, circular and/or annular surface for crystallization perform a linear movement but, in a compact construction, to use a rotational movement of the rotatable receiving unit. Because the preliminary product to be crystallized that is received is applied homogeneously, without being mixed, a circular movement of the upper surface of the receiving unit permits a defined crystallization and a defined residence time. Because the preliminary product to be crystallized is simply applied to a surface, in particular a smooth surface, of the rotatable receiving unit, the receiving unit is easy to clean and all requirements that are made of CIP cleaning, for example, in the foodstuffs industry and the pharmaceutical industry, can be met absent a large outlay.

It is particularly advantageous that the circular and/or annular surface of the rotatable receiving unit is at least in part or wholly in the form of a free surface. No further components which could come into contact with the crystallizing preliminary product during crystallization are thus arranged or necessarily required on the surface with the crystallizing preliminary product. Apart from the rotatable receiving unit itself and the associated rotary drive, further units, such as conveying units or a belt tensioner, are moreover not essential for operation. A compact crystallization apparatus which can be produced inexpensively and which can easily be hygienically cleaned is thus provided.

It should be pointed out that in principle the crystallization apparatus can also be configured the other way round in respect of the rotation so that, instead of a rotatable receiving unit, the receiving unit is fixed and/or stationary and instead the inlet, a discharge element and/or a removal device, moves in a circular manner. The rotary drive is in this case thus associated with the inlet, the discharge element, and/or the removal device.

The following terminology is to be explained:

A "crystallization apparatus" is in particular an apparatus with which the physical process of crystallization and thus hardening, the formation, and/or the growth of crystals takes place. Crystallization takes place in and/or on the crystallization apparatus, in particular in an accelerated manner.

During crystallization, crystals in particular form in a solution, a melt, an amorphous solid, and/or by recrystallization from other crystals.

A "preliminary product" is understood as in particular being an intermediate product in the course of physical and/or chemical working up and/or reaction to a saleable product, in particular a crystallized product. Any solid substance, such as, for example, a bulk material or powder, can in principle be used as the preliminary product to be crystallized. The preliminary product can likewise be produced in various branches of industry, such as the foodstuffs industry, basic chemistry, or the pharmaceutical industry. The preliminary product is in particular non-hygroscopic permeate, such as, for example, whey permeate powder. In the case of concentrated and dried whey permeate as the preliminary product, this is then subjected in the crystallization apparatus to conversion from α-lactose into β-lactose and crystallization.

An "inlet" is in particular a component with which the preliminary product to be crystallized is applied to the upper side of the circular and/or annular surface of the rotatable receiving unit. The inlet is in particular arranged above the circular and/or annular surface of the receiving unit so that the preliminary product to be crystallized falls onto and/or can be applied to the circular and/or annular surface directly. An inlet can, for example, be a feed pipe from a spray dryer.

A "receiving unit" is in particular a unit of the crystallization apparatus which receives the preliminary product coming from the inlet. The receiving unit in particular has on its upper side a circular and/or annular surface to which the preliminary product to be crystallized is applied for crystallization and on which it remains during rotation. The receiving unit can be in the form of, for example, a disc or a ring. The receiving unit and/or the surface thereof can either be cooled, heated and/or otherwise conditioned. The crystallization apparatus and/or the receiving unit is in particular operated continuously.

A "circular surface" is understood as in particular being a surface of the receiving unit which, when seen from above, has the shape of a circle. An "annular surface" is understood as in particular being a surface which, when seen from above, has the shape of a ring. An annular surface is in particular a circular ring and thus the area between two concentric circles with a common center. The surface on the upper side of the receiving unit can of course also be formed by a first circular surface on the inside and a second annular surface arranged externally around the first surface.

A "rotary drive" is understood as in particular being a drive which imparts a rotational movement to the rotatable receiving unit. The rotary drive is in particular a prime mover, such as, for example, a motor. A rotary drive can be, for example, a rotary motor which converts three-phase current into a mechanical rotation.

The rotatable receiving unit can be driven via the rotary drive by way of its outer lateral edge, its outer underside, and/or by way of a central rotational axis. A drive on the outside diameter of the receiving unit in the form of a disc or ring is advantageous, in particular where the disc or ring has a large diameter. This can take place, for example, by way of a motor with a toothed rack and rollers. A driven central axis is advantageous in the case of smaller diameters of the disc and/or ring, for example, via a gear motor and a toothed belt.

"Recrystallizable in a defined manner" is understood as in particular meaning that defined crystallization conditions for the recrystallization of the preliminary product to be crystallized from one crystal form into another desired crystal form and/or a specific purity of a crystal form are provided. The defined crystallization and/or recrystallization is in particular achieved due to the fact that the received preliminary product rests on the upper surface of the receiving unit without a mixing of the preliminary product and/or of the crystals that form, and due to the defined residence time owing to the rotation of the receiving unit.

In a further embodiment of the crystallization apparatus, the rotatable receiving unit is in the form of a disc and/or in the form of a ring.

In its simplest form, the rotatable receiving unit is in the form of a single disc and/or in the form of a ring which in each case has a sufficiently large diameter so that the preliminary product that crystallizes out and/or is recrystallized remains on the upper surface of the disc and/or ring during crystallization without further components, in particular walls or a housing.

Because no further components directly adjoin the surface of the disc or ring, and the surface is likewise designed to be free of a rim or an outer delimiting wall in its simplest form, there are no corners and/or edges in the rotatable receiving unit in and/or at which crystallized product can accumulate. The rotatable receiving unit is therefore formed in one piece as a disc or ring with its circular and/or annular surface on the upper side.

A "disc" is understood as in particular being a geometric body in the form of a cylinder, the radius of which is greater by a multiple than its thickness. A disc can also be a plate.

A "ring" is in particular a geometric body in which the area between two concentric circles has a greater dimension than its thickness in the vertical direction.

The disc can, for example, have an outside diameter of from 0.5 m to 6.5 m, for example, in a range of from 4.0 m to 5.5 m. The mass flow of crystallized product is, for example, in a range of from 0.5 t/h to 8 t/h, for example, from 3 t/h to 5 t/h. The temperature in the crystallization apparatus can, for example, be in a range of from 10° C. to 90° C.

The disc and/or the ring can, for example, be manufactured from a dimensionally stable material. Such a material can, for example, be welded stainless steel or a food-grade plastics material. The surface of the disc and/or ring is or are in particular very smooth so that the crystallized preliminary product can easily be removed and cannot accumulate at a surface structure of the surface and impede cleaning.

In order to avoid the preliminary product that is crystallizing out from being moved outwards, in particular by the rotational movement, beyond the edge of the disc or ring, and thus be lost, the rotatable receiving unit has an outer delimiting wall, an inner delimiting wall, a cover and/or a housing.

The rotatable receiving wall, the disc, and/or the ring can thus have an outer delimiting wall at the outside diameter and an encircling inner delimiting wall extending at a distance from the center of the disc or ring. A crystallization space that is open at the top is thus formed between the outer delimiting wall and the inner delimiting wall. The receiving unit, the disc, and/or the ring can also have a cover which rests on the delimiting walls, or a surrounding housing. The covered outer delimiting wall and the inner delimiting wall thus form an annular chamber for the crystallization. Controlled conditions for the crystallization are thus provided and, in the case of a largely closed housing, a through-flow cleaning is possible. The upper surface of the receiving unit in the region of the inlet can here be freely accessible and/or open so that the preliminary product to be crystallized can fall and/or be applied to the upper surface directly from the inlet.

In a further embodiment, the crystallization apparatus has a second rotatable receiving unit, a third rotatable receiving unit, and/or further rotatable receiving units, wherein the rotatable receiving units in question are arranged side by side and/or one behind the other.

The crystallization and/or conversion can thus be divided between a plurality of rotatable receiving units and thus between a plurality of rotatable upper surfaces. By arranging the receiving units in parallel and/or connected one behind the other, the crystallization processes can in particular in each case purposively be adjusted and/or can take place stepwise in succession. The stepwise formation, the growth, and the hardening as well as a conversion of the crystals can thus purposively be controlled in terms of the process. An arrangement in parallel and/or connected one behind the other is understood in particular as meaning the arrangement of the receiving units in terms of the process. The receiving units can of course also be arranged spatially in a space-saving manner one above the other.

In the case of a stepwise arrangement of the rotatable receiving units one after the other, the at least partially crystallized preliminary product and/or product accordingly falls directly onto the rotatable receiving unit of the following stage. This parallel and/or series connection of rotatable receiving units is in particular advantageous when very high crystallization capacities are required because very large diameters of the disc and/or ring can be increased only with an increasing outlay. In particular in the case of discs with a large diameter, the disc can be supported from beneath by a counter bearing, for example, a subframe with rollers, in order to provide that the surface of the disc or ring is oriented horizontally.

A "second, third and/or further rotatable receiving unit" is in principle a receiving unit as defined above in terms of function and construction. The receiving units can, however, each have different surface dimensions, rotational speeds, and/or further different geometric parameters, and/or operating parameters. Each receiving unit can also formed be in one piece and/or have a plurality of annular and/or circular surfaces.

In order to achieve a uniform distribution and/or covering thickness of the preliminary product to be crystallized that is applied to the respective upper surface, the crystallization apparatus has a distributor device for distributing the received preliminary product on the circular and/or annular surface of the rotatable receiving unit, of the rotatable receiving unit in question, or of the receiving units.

The distributor device for homogeneously distributing the received preliminary product on the surface of the rotatable receiving unit can thus be arranged in the outlet of an upstream unit, such as, for example, a drying tower, and/or in the inlet of the crystallization apparatus. The preliminary product to be crystallized can, for example, be distributed homogeneously via a purposive geometric arrangement of guide and/or perforated plates and/or by the use of a milling element at the point of delivery of the preliminary product to be crystallized.

In a further embodiment, the rotatable receiving unit has, or the rotatable receiving units have, a rotational speed in a range of from 0.5 rph to 20 rph, for example, from 1 rph to 10 rph, via the rotary drive.

The crystallization apparatus can in principle have a single rotary drive so that all the rotatable receiving units can be operated at the same rotational speed. Different transmission gears for the respective rotatable receiving units can, however, also be associated with the rotary drive so that the respective rotatable receiving units can each have different rotational speeds. The respective receiving units can likewise have their own rotary drive, or two or more rotary drives are associated in each case with two or more receiving units.

Depending on the required residence time for crystallization, the rotational speed can, for example, be in a range of from one revolution per hour to 10 revolutions per hour. In the case of a residence time of 20 minutes, for example, the rotational speed of the rotatable receiving unit is three revolutions per hour. A relatively low rotational speed and thus a relatively low rotational movement is thus, for example, used for the crystallization.

If a longer residence time is required, two or more rotatable receiving units can be used in the crystallization apparatus, instead of the reduction in the rotational speed. An increase in the crystallization capacity can additionally be achieved by increasing the number of rotatable receiving units. The rotatable receiving units can thereby be arranged and connected in parallel and/or in succession in order to provide the required longer residence time and/or higher crystallization capacity, and thus the desired mass flow of product.

In order to adjust and/or influence the crystallization and/or conversion process in a defined manner, the crystallization apparatus has a control and/or regulating device, so that a crystallization time is adjustable via the rotary drive by way of the rotational speed of the rotatable receiving unit.

Owing to the defined circular movement, a crystallization and/or conversion time can intentionally be adjusted via the rotary drive and/or the control and regulating device by way of the rotational speed of the rotatable receiving unit or the respective receiving unit. In the case of continuous rotation of the disc or ring, the preliminary product to be crystallized is continuously deposited on the surface of the disc or ring by way of the inlet, which is fixed in position. It is particularly advantageous that the necessary crystallization time is reached, and the crystallized product is present substantially on one rotation of the disc or ring. For the defined crystallization, the disc and/or ring performs, for example, a revolution of 359°. This can be achieved in that there is an angle in a range of from 340° to 360° between the fixed inlet of the crystallization apparatus and a removal device.

A "control device" is understood in particular as being a device which sets a predefined value. A "regulating device" is understood in particular as being a device which feeds back a measured value and sets a control value in each case. The optimal crystallization time and/or conversion time of the individual rotatable receiving units can thus be adjusted and/or regulated via the control and/or regulating device.

In a further embodiment, the crystallization apparatus has a removal device, in particular a discharge screw, for discharging the crystallized product from the circular and/or annular surface of the rotatable receiving unit and/or of the rotatable receiving units.

A discharge screw or a scraper can, for example, be used as the removal device. A pusher can also be used, and/or the crystals which have formed are discharged via blowing and/or suction. The removal device is in particular adapted so that the crystals are discharged completely from the surface and/or from the annular chamber and, where there are delimiting walls, do not remain at the edges. Colonization with microorganisms is consequently impeded and efficient CIP cleaning is possible. A wet and/or a dry automatic cleaning station can moreover be integrated between the discharge element and the inlet in order to avoid a mixing of preliminary product and crystallized product, and also between batches and also in order eliminate the formation of hygiene weak points.

In order to specify a defined crystallization time and/or conversion time via the extent of the revolution, the removal device is arranged so that, between the inlet and the removal device, there is an angle in a range of from 300° to 360°, in particular from 340° to 360°, on the circular and/or annular surface.

In a further embodiment, the crystallization apparatus has an air supply device for passing a flow of air over the preliminary product received and/or distributed on the surface. The crystallization process can thereby be facilitated and/or the crystallized product can be further conditioned.

A further aspect of the present invention provides a drying apparatus, in particular a spray tower, for the drying of a material to be dried to form a pre-dried product and/or for the final drying of a crystallized product, wherein the drying apparatus has an above-described crystallization apparatus.

There is accordingly provided a drying apparatus which can be used, for example, for the drying of a material to be dried, such as liquid whey permeate, to form a pre-dried product, such as solid whey permeate powder, and/or for the final drying of a crystallized product. The crystallization apparatus can thus be arranged both upstream of and downstream of the drying apparatus.

The drying apparatus can, for example, have an open outlet for releasing the pre-dried product through which the pre-dried product falls through the inlet, arranged therebeneath, of the crystallization apparatus directly onto the upper side of the disc and/or ring. Transfer to secondary further drying and cooling can then take place after the drying apparatus and the crystallization apparatus.

The crystallization apparatus can likewise be used after a secondary drying, for example, after a fluidized bed which is arranged downstream of a spray tower. The crystallization apparatus with, for example, the rotatable disc can thus be connected both to a spray tower having an open, lower outlet and to a spray tower having a downstream external fluidized bed. Only the bearing point of the disc relative to the center axis of the spray tower is here shifted.

The present invention will be explained in detail below via exemplary embodiments as shown in the drawings.

A crystallization rotor 101 has a crystallization disc 103. The crystallization disc 103 is rotatably mounted by way of a rotational axis 115 and can be driven by a disc drive 113. The crystallization disc 103 is enclosed by a housing 105 which has an outer wall 107. An inner wall 109 is further arranged above the crystallization disc 103 inside the housing 105, whereby an annular chamber 111 is formed. The annular chamber 111 is designed to extend 3600 in a circle around the rotational axis 115 in the outer region of the crystallization disc 103. An inlet 119 is arranged at a fixed position in this outer region which is connected to a spray tower outlet 203, which is arranged thereabove, of a spray tower 201 (only the lower part of the spray tower 201 is shown in FIG. 1). The inlet 119 leads downwards into the annular chamber 111, wherein a discharge screw 117 is arranged above the upper surface of the crystallization disc 103 spaced apart from the inlet 119 and thus from the spray tower outlet 203 by an angular distance of 5°.

Figure 2:
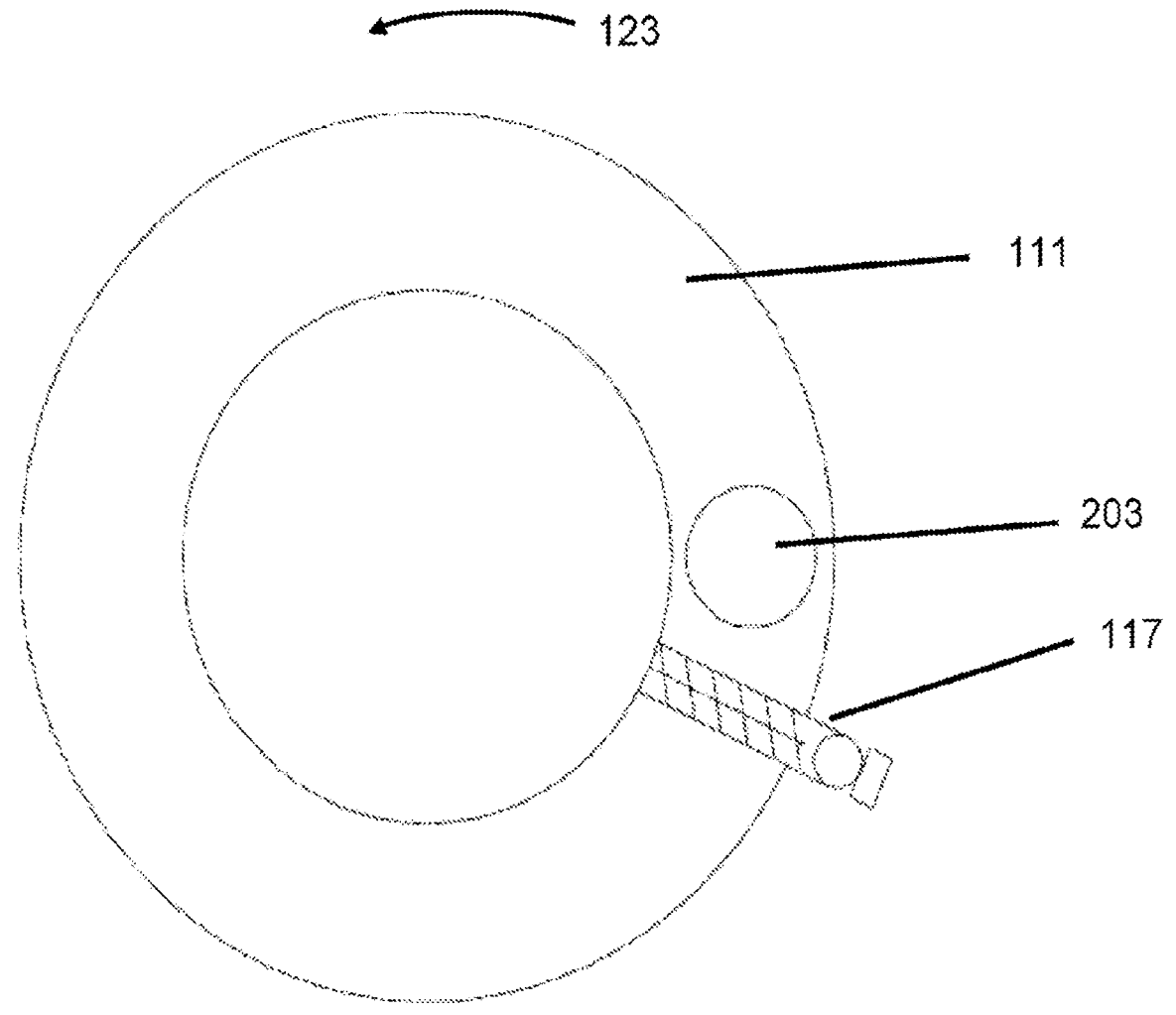
FIG. 2 shows a highly schematic top view of the crystallization rotor with the spray tower outlet and a discharge screw in cross-section.

The following working steps are carried out by the crystallization rotor 101:

A liquid whey permeate is first pre-dried in the conventional manner in the spray tower 201 to form whey permeate powder and passes continuously by way of the spray tower outlet 203 into the inlet 119 of the crystallization rotor 101. Via distributor plates and a milling element (not shown), the whey permeate powder falling through the inlet 119 is distributed uniformly on the upper surface of the rotating crystallization disc 103, which rotates in an anticlockwise rotational direction 123 (see FIG. 2) at a rotational speed of five revolutions per hour. The whey permeate powder delivered through the spray tower outlet 203 and the inlet 119 arranged therebeneath onto the surface of the crystallization disc 103 in the annular chamber 111 thus performs a uniform revolution of 355° in each case during crystallization and conversion until it reaches the discharge screw 117 and, via the discharge screw 117, the whey permeate crystals, which have a high β-lactose content as a result of the optimal conversion of α-lactose into β-lactose crystals, are discharged from the crystallization rotor 101 via the discharge screw 117 by way of the discharge element 121.

A very compact crystallization rotor 101 is thus provided which, because it is made of stainless steel, has a very smooth surface, wherein undesirable accumulation of the crystals is prevented and purposive conversion into β-lactose and easy cleaning of the crystallization disc 103 are possible.

The present invention is not limited to embodiments described herein; reference should be had to the appended claims.

LIST OF REFERENCE SIGNS 101 crystallization rotor
103 crystallization disc
105 housing
107 outer wall
109 inner wall
111 annular chamber
113 disc drive
115 rotational axis
117 discharge screw
119 inlet
121 discharge element
123 anticlockwise rotational direction
201 spray tower
203 spray tower outlet

What is claimed is:

1. A crystallization apparatus for a crystallization of a preliminary product, the crystallization apparatus comprising:
an inlet for receiving the preliminary product;
a drying apparatus which is configured to provide the preliminary product to the inlet;
at least one rotary drive; and
a first rotatable receiving unit comprising, on an upper side thereof, a circular/annular surface for crystallization and recrystallization,
wherein,
the first rotatable receiving unit is designed as a disc/ring,
the circular/annular surface is provided to be smooth and completely free, and
the first rotatable receiving unit is configured so that, when the first rotatable receiving unit is rotated by the at least one rotary drive, the preliminary product received is crystallized and/or recrystallized in a defined manner on the circular/annular surface and is discharged as a crystallized product.

2. The crystallization apparatus as recited in claim 1, wherein the first rotatable receiving unit further comprises at least one of an outer delimiting wall, an inner delimiting wall, a cover, and a housing.

3. The crystallization apparatus as recited in claim 1, further comprising:
at least one further rotatable receiving unit each comprising, on an upper side thereof, a circular/annular surface provided to be smooth and completely free for crystallization and recrystallization, wherein,
the at least one further rotatable receiving unit are each designed as a disc/ring,
and
each of the at least one further rotatable receiving units are configured so that, when the at least one further rotatable receiving unit is rotated by the at least one rotary drive, the preliminary product is crystallized and/or recrystallized in a defined manner on the circular/annular surface and is discharged as a crystallized product, wherein
the first rotatable receiving unit and each of the at least one further rotatable receiving unit are arranged side by side.

4. The crystallization apparatus as recited in claim 3, further comprising:
a distributor device which is configured to distribute the preliminary product which is received,
on the circular/annular surface of the first rotatable receiving unit, or
on the circular/annular surface of the first rotatable receiving unit, and on the circular/annular surface of each of the at least one further rotatable receiving unit.

5. The crystallization apparatus as recited in claim 3, wherein the at least one rotary drive are each configured to rotate
the first rotatable receiving unit so as to have a rotational speed in a range of from 0.5 revolutions/hour to 20 revolutions/hour, or
the first rotatable receiving unit and each of the at least one further rotatable receiving unit so as to each have a rotational speed in a range of from 0.5 revolutions/hour to 20 revolutions/hour.

6. The crystallization apparatus as recited in claim 5, further comprising:
a control device and/or a regulating device which is/are configured so that a crystallization time is adjustable via the at least one rotary drive via the rotational speed, the crystallization time being a residence time in the first rotatable receiving unit and in each of the at least one further rotatable receiving unit.

7. The crystallization apparatus as recited in claim 3, further comprising:
at least one removal device which is configured to discharge the crystallized product from,
the upper side of the circular/annular surface of the first rotatable receiving unit, and/or
from the upper side of the circular/annular surface of each of the at least one further rotatable receiving unit.

8. The crystallization apparatus as recited in claim 7, wherein the at least one removal device comprises a discharge screw.

9. The crystallization apparatus as recited in claim 7, wherein each of the at least one removal device is arranged so that, between the inlet and the at least one removal device, there is an angle in a range of from 300° to 360° on the circular/annular surface.

10. The crystallization apparatus as recited in claim 1, wherein the drying apparatus is a spray tower.

11. A crystallization apparatus for a crystallization of a preliminary product, the crystallization apparatus comprising:

an inlet for receiving the preliminary product;

a drying apparatus which is configured to provide the preliminary product to the inlet;

at least one rotary drive; and a first rotatable receiving unit comprising, on an upper side thereof, a circular/annular surface for crystallization and recrystallization, wherein, the first rotatable receiving unit is designed as a disc/ring, the circular/annular surface is provided to be smooth and completely free, and the first rotatable receiving unit is configured so that, when the first rotatable receiving unit is rotated by the at least one rotary drive, the preliminary product received is crystallized and/or recrystallized in a defined manner on the circular/annular surface and is discharged as an at least partially crystallized product and/or as a crystallized preliminary product; and at least one further rotatable receiving unit which is/are arranged downstream of the first rotatable receiving unit, each of the at least one further rotatable receiving unit comprising, on an upper side thereof, a circular/annular surface provided to be smooth and completely free for crystallization and recrystallization, wherein, each of the at least one further rotatable receiving unit is designed as a disc/ring, and the at least one further rotatable receiving unit are each configured so that, when the at least one further rotatable receiving unit is rotated by the at least one rotary drive, the at least partially crystallized preliminary product and/or the crystallized product received from the first rotatable receiving unit or from an upstream further rotatable receiving unit is crystallized and/or recrystallized in a defined manner on the circular/annular surface and is discharged as an at least partially crystallized preliminary product and/or as a crystallized product.

12. The crystallization apparatus as recited in claim 11, wherein the rotatable receiving unit and/or each of the at least one further rotatable receiving unit further comprise(s) at least one of an outer delimiting wall, an inner delimiting wall, a cover, and/or a housing.

13. The crystallization apparatus as recited in claim 11, further comprising:

a distributor device which is configured, to distribute the preliminary product which is received on the circular/annular surface of the first rotatable receiving unit, and/or to distribute the at least partially crystallized product and/or the crystallized product which is received on the circular/annular surface of each of the at least one further rotatable receiving unit.

14. The crystallization apparatus as recited in claim 11, wherein the at least one rotary drive is configured to rotate the first rotatable receiving unit and each of the at least one further rotatable receiving unit so as to have a rotational speed in a range of from 0.5 revolutions/hour to 20 revolutions/hour.

15. The crystallization apparatus as recited in claim 14, further comprising:

a control device and/or a regulating device which is/are configured so that a crystallization time is adjustable via the at least one rotary drive via the rotational speed, the crystallization time being a cumulative residence time in each of the first rotatable receiving unit and in each of the at least one further rotatable receiving unit.

16. The crystallization apparatus as recited in claim 11, further comprising:

at least one removal device which is configured to discharge the crystallized product from, the upper side of the circular/annular surface of the first rotatable receiving unit, and/or the upper side of the circular/annular surface of each of the at least one further rotatable receiving unit.

17. The crystallization apparatus as recited in claim 16, wherein the at least one removable device comprises a discharge screw.

18. The crystallization apparatus as recited in claim 16, wherein each of the at least one removal device is arranged so that, between the inlet and the at least one removal device, there is an angle in a range of from 300° to 360° on the circular surface and/or the annular surface.

19. The crystallization apparatus as recited in claim 11, wherein the drying apparatus is a spray tower.

* * * * *